US005795668A

United States Patent [19]

Banerjee

[11] Patent Number: 5,795,668
[45] Date of Patent: Aug. 18, 1998

[54] FUEL CELL INCORPORATING A REINFORCED MEMBRANE

[75] Inventor: Shoibal Banerjee, Newark, Del.

[73] Assignee: E. I. du Pont de Nemours and Company, Wilmington, Del.

[21] Appl. No.: 339,167

[22] Filed: Nov. 10, 1994

[51] Int. Cl.⁶ ............................................. H01M 8/10
[52] U.S. Cl. .................................................. 429/33; 429/12
[58] Field of Search ..................................... 429/12, 33

[56] References Cited

U.S. PATENT DOCUMENTS

| | | |
|---|---|---|
| 3,692,569 | 9/1972 | Grot . |
| 4,453,991 | 6/1984 | Grot . |
| 4,604,170 | 8/1986 | Miyake et al. ........................... 204/98 |
| 4,897,457 | 1/1990 | Nakamura et al. ...................... 526/247 |
| 5,409,785 | 4/1995 | Nakano et al. .......................... 429/33 |

*Primary Examiner*—Prince Willis, Jr.
*Assistant Examiner*—Carol Chaney

[57] ABSTRACT

A fuel cell and a battery with a reinforced polymeric ion exchange membrane are disclosed. The membrane comprises (a) a porous support layer, preferably of fluorine-containing polymer, and (b) an ion exchange resin, preferably a fluorinated ion exchange layer(s) supported on one or both sides of the porous support layer. The total thickness of the membrane is preferably from 20 to 500 μm. The membrane has low fuel crossover, high electric conductivity and high mechanical strength. The membrane may especially be used in a direct methanol fuel cell.

10 Claims, 1 Drawing Sheet

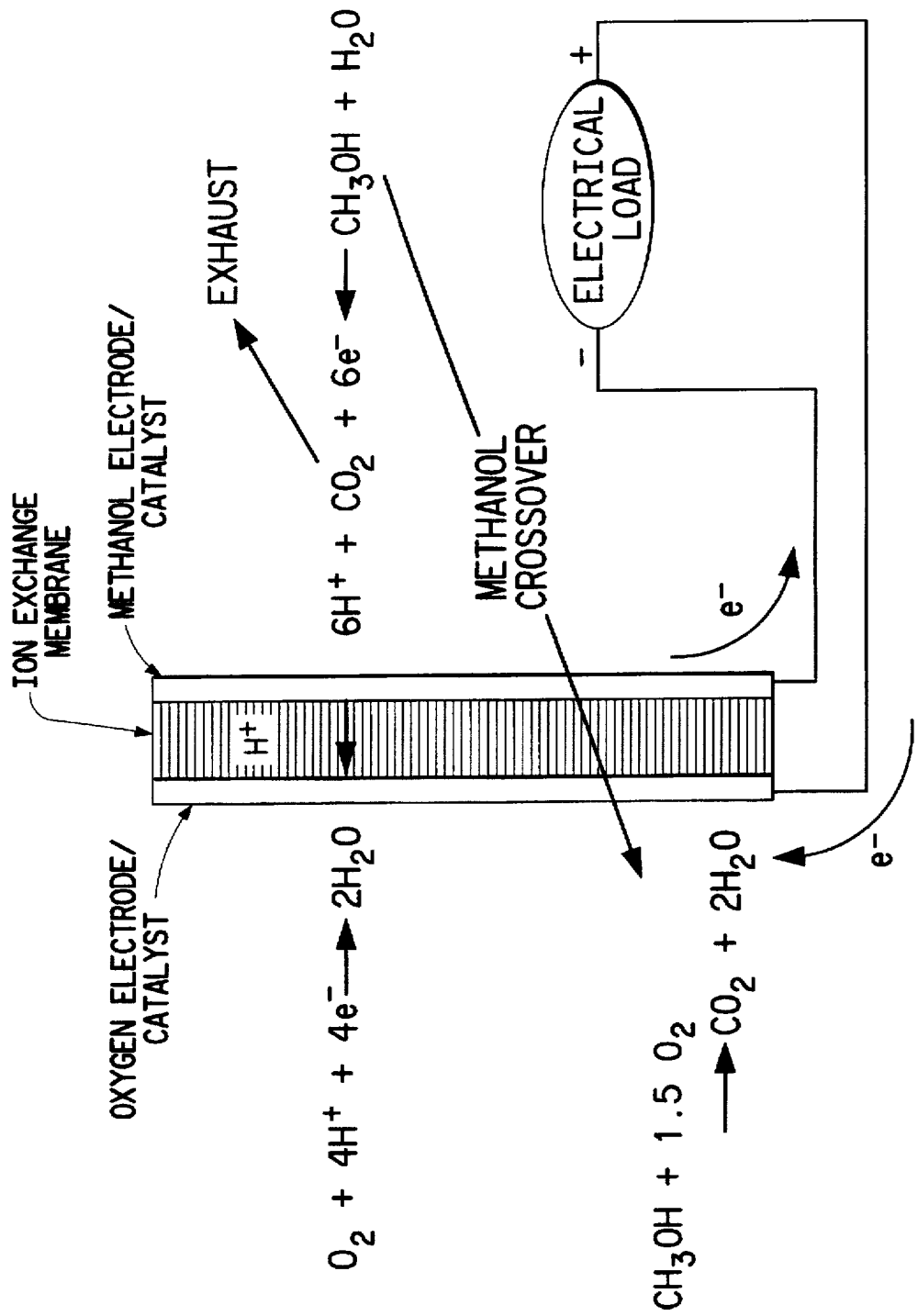

FUEL CELL INCORPORATING A REINFORCED MEMBRANE

FIELD OF THE INVENTION

The present invention relates to the novel use of a reinforced polymeric ion exchange membrane in a fuel cell or a battery. More particularly, the present invention relates to a fuel cell or a battery which is useful for the production of electricity having a reinforced membrane, which advantageously possesses low transport of fuel and high mechanical strength. The membrane is particularly useful in direct methanol fuel cells.

BACKGROUND OF THE INVENTION

Fuel cells and batteries are electrochemical cells for the production of energy which may employ a polymeric ion exchange membrane therein.

For example, fuel cells continuously convert chemical energy of a fuel oxidation reaction into electrical energy. At the anode, fuel molecules are oxidized donating electrons to the anode, while at the cathode the oxidant is reduced accepting electrons from the cathode. The ions formed at the anode migrate through the electrolyte to the cathode and combine with the oxidant to form a reaction product, completing the electric circuit. The anode and cathode compartments of the fuel cell are separated by an ion exchange membrane, typically a polymer ion exchange membrane, especially a fluorinated polymer ion exchange membrane. Polymeric ion exchange membranes are often referred to as "solid polymer electrolytes".

Fuel cells are presently being considered as prime candidates for, among other things, replacing the internal combustion engine for transportation applications in view of their inherent high efficiency and low emissions.

From the point of view of thermodynamic efficiency, such fuel cells constitute the most advantageous method for the direct conversion of fuel to electrical energy; however, it is desirable to reduce the so-called "crossover" of fuel through the polymeric membrane.

In the fuel cell technology, the term "crossover" refers to the undesirable transport of fuel through the polymer electrolyte layer from the fuel electrode or anode side to the air/oxygen electrode or cathode side of the fuel cell. FIG. 1 is a schematic drawing which depicts the methanol crossover in a methanol fuel cell. After having been transported across the membrane, the fuel will either evaporate into the circulating air/oxygen stream or react with the oxygen at the air/oxygen electrode.

The fuel crossover diminishes cell performance for two primary reasons. First, the transported fuel cannot react electrochemically and, therefore, contributes directly to a loss of fuel efficiency (effectively a fuel leak). Secondly, the transported fuel interacts with the cathode (often an air/oxygen electrode) and lowers its operating potential and hence the overall cell potential. The reduction of cell potential lowers specific cell power output and also reduces the overall efficiency.

To date, efforts to improve the fuel crossover have focused on (i) experimenting with flow rate, concentration and temperature of the fuel mixture; (ii) improving cathode catalysts insensitivity to the presence of fuel in the oxidant stream; and (iii) experimenting with alternate fuels or fuel mixtures which may result in lower crossover rates. The present invention focuses on the polymeric ion exchange membrane.

The most well known fuel cells are those which operate with gaseous fuels, mainly hydrogen, and with a gaseous oxidant, preferably oxygen, and those fuel cells using liquid fuels such as methanol.

During operation of a fuel cell using, for example, gaseous hydrogen and oxygen as the reactants, hydrogen ions (H+ ions) are formed at the anode and O$^-$ ions are formed at the cathode. However, only the hydrogen O$^-$ ions are mobile in the ion exchange membrane; i.e., ion transport and flow of current within the cell can be effected only by means of hydrogen ions, which diffuse through the membrane, from the anode to the cathode, where they react with the O$^-$ ions to form water. Migration of O$^-$ ions through the ion exchange membrane occurs only to a very limited extent, because the O$^-$ ions have the same type of charge as the solid ions bound in the membrane.

Ion exchange membranes, typically a perfluorocarbon ion exchange polymer membrane, are well known in the art. Such ion exchange membranes have good chemical and thermal resistance and have been used in electrochemical cells, including methanol-air fuel cells and hydrogen-oxygen fuel cells.

Prior art fuel cells and batteries have used unreinforced ion exchange membranes. Because the polymer film itself is usually self-supporting and the film is substantially gas impermeable, no porous support matrix was deemed to be needed. Reinforced membranes are particularly useful in electrolytic cells, such as chloralkali cells.

In addition, the mechanical strength of membranes used in a fuel cell and a battery, especially a gaseous fuel cell, is also important. For example, many fuel cells operate at a high differential pressure which increases the likelihood of damage to the fragile ion exchange membrane. In addition, fuel cells, especially fuel cells used in motor vehicles or similar applications, are frequently shut down and restarted; such cycling causes the membrane to dehydrate and rehydrate which causes stress and further increases the likelihood of damage to the membrane. The mechanical strength of fuel cell membranes is particularly important when the membrane is thin and when the polymeric component layers are fabricated from low equivalent weight polymers.

The prior art also discloses membranes obtained by laminating a stretched porous layer and an ion exchange layer having sulfonic acid groups. For example, U.S. Pat. No. 4,604,170 (Miyake et al.) describes such a membrane, but the membrane is limited to use in electrolysis, particularly electrolysis of an alkali metal chloride solution. The prior art, including U.S. Pat. No. 4,604,170, does not appreciate or teach the present invention which may provide a membrane for use in a fuel cell or a battery which is capable of concurrently delivering low crossover of fuel; high voltage at a given current density; low electric resistance; good water management; and particularly high mechanical strength.

Therefore, it is especially desirable to provide for use in a fuel cell or a battery a reinforced polymeric ion exchange membrane which has a low crossover rate and good mechanical strength while maintaining the advantages of prior art membranes.

SUMMARY OF THE INVENTION

The present invention provides fuel cell or a battery which incorporates a reinforced ion exchange membrane disposed therein. The membrane comprises (a) a porous support layer, preferably of a fluorine-containing polymer having a pore diameter of from about 0.05 to 10 μm, a porosity of from about 50 to about 95% and a thickness of from 10 to 200 μm and (b) one or more polymeric ion exchange resins, preferably in the form of layers supported on either or both sides and preferably having a thickness less than about 250 μm and an equivalent weight of about 500 to 2000 and preferably an ion exchange capacity of from 0.5 to 2.0 meq/g dry resin. The polymeric ion exchange resin layers may be made from polymers known in the art such as sulfonated polystyrene or more preferably fluorinated polymers, preferably having sulfonyl or carboxyl ion exchange groups.

The reinforced polymeric membrane reduces the crossover of fuel in the fuel cell or a battery, increases the mechanical strength of the membrane, and may provide an excellent combination of electrical properties including high voltage at a given current density, relatively low electrical resistance and good water management. Preferably, the membrane exhibits transport of methanol (in a 3.2% by weight aqueous solution) at 60° C. of less than $4.0 \times 10^5$ μm methanol per minute per square centimeter. Preferably, the reinforced membrane of the present invention reduces transport of methanol by at least 10%, preferably 20%, over the corresponding unreinforced membrane. The fuel cell may use a liquid or gaseous fuel, preferably a liquid hydrocarbon fuel, especially methanol, and is capable of operating at a wide range of operating conditions.

SUMMARY OF THE DRAWINGS

FIG. 1 is a schematic drawing which depicts the transport of methanol fuel across an ion exchange membrane in a methanol fuel cell.

DETAILED DESCRIPTION OF THE INVENTION

The fuel cell and the battery of the present invention incorporate a polymeric ion exchange membrane, which is disposed therein. The membrane of the present invention is a combination of the porous support layer and one or more ion exchange resin layers. This membrane is particularly suited for use in a fuel cell. The porous support layer is preferably a fluorine-containing polymer having a pore diameter of from 0.05 to 10 μm, a porosity of from about 50 to about 95% and a thickness of from 30 to 200 μm, and with its pore surfaces being substantially hydrophilic. The ion exchange resin layer supported on either or both sides of the porous support layer preferably has a thickness thinner than about 250 μm, an equivalent weight of about 500 to about 2000 and preferably an ion exchange capacity of from 0.5 to 2.0 meq/g dry resin.

In the present invention, the performance of the fuel cell depends largely on the equivalent weight and thickness of the ion exchange resin layer or layers, and the porous layer serves as the support and reinforcement of the ion exchange resin layer. In addition, it is believed that the porous support layer restricts the in-plane swelling during operation of the membrane, which advantageously results in reduced fuel crossover. In particular, the swelling of the reinforced membrane is primarily in the thickness direction, which increases the tortuousity for a fuel molecule to pass through the membrane. Together, the ion exchange resin layers and the porous support layer serve to reduce the crossover of fuel. Thus, the membrane of the present invention is constituted by an ion exchange layer having a continuous barrier to substantially stop bulk flow of the reactants, and a porous support layer. The membrane preferably has low electric resistance and high mechanical strength.

As is apparent to one skilled in the art, the thickness, porosity and composition of the porous support layer may be adjusted to provide the desired combination of properties. For example, a fuel cell having a membrane with a thick support layer will typically provide low fuel crossover and high mechanical strength but may have relatively high electrical resistance.

Fuel Cell

The design, fabrication and operation of a battery is well known in the art. The design, fabrication and operation of the fuel cell is also well known in the art. In particular, the operation of fuel cells involves the oxidation of fuels. The fuels may be fed to the fuel cell as liquids or gases. Liquid fuel cells are generally preferred.

There are several clear practical advantages of cells using liquid fuels over the hydrogen-based systems. Electrodes with complicated pore structures which enable contact to be made between catalyst, solution and gaseous fuel can be replaced by much simpler devices in contact only with the solution, although of course a conventional oxygen or air electrode may still be required. Liquid fuels are generally more easily stored than gases: no bulky and heavy cylinders are needed and the energy: mass and energy: volume ratios for the complete power units are likely to be better. The list of requirements for a fuel of this sort is formidable: it should have freezing and boiling points such that it remains liquid over a wide range of temperatures; it should be soluble in strongly acid and strongly basic media without irreversible chemical reaction taking place; it must be reasonably cheap and easily available; it should be safe to handle; it should react rapidly and without side effects at a suitable positive electrode to give inoffensive products, preferably gaseous, and this reaction should have a low overpotential; finally it should not react appreciably at the oxidant or negative electrode. Clearly, it is improbable that any one substance could prove such a paragon. Therefore, fuel cells and the membranes incorporated therein must be capable of utilizing a wide variety of fuels at different operating conditions. Likewise, the membrane must be capable of reducing fuel crossover for a wide variety of fuels at different operating conditions.

Organic fuels which may be useful in fuel cells include, without limitation, formaldehyde, ethanol, methanol, propanol, propylene, butane, ethane and methane. Study of electrochemical oxidation shows that the most satisfactory substances from the point of view of reactivity are methanol, formaldehyde, ethanol, ethylene glycol and formic acid. Higher alcohols and acids were very much less reactive. Among those substances listed, methanol seems to have the fewest disadvantages, all of the others having severe drawbacks. For example, formaldehyde has a low boiling point (−21° C.) and is rather unstable; ethanol oxidizes to acetic acid which is not particularly volatile; and formic acid reacts in a much less satisfactory way in alkaline solution (when it is, of course, present largely as the formate anion).

Some inorganic fuels have also been examined. Four materials seem to have some promise: ammonia, hydrazine, hydroxylamine and sodium borohydride. Hydrazine, although explosive and poisonous, has been used in some trial systems with success, and ammonia has also been used.

Many efforts have focused on direct methanol fuel cells. Direct oxidation fuel cells that use liquid methanol or other oxygenated fuels directly are ideal for transportation applications in view of their lower weight and volume as compared to indirect cells. The weight and volume advantages of direct oxidation fuel cells are due to the fact that they do not require any fuel pre-processing equipment. Elimination of these components results in simpler design and operation, higher reliability, less maintenance, and lower capital and operating costs. Further, direct oxidation fuel cells are projected to have rapid, multiple start capabilities and the ability to easily follow varying loads. In addition, the products of the reaction are only carbon dioxide and water resulting in an environmentally desirable system. Alternative fuels such as dimethoxymethane (DMM), trimethoxymethane (TMM) etc. have also been identified as having potential.

It has been found that fuel cells operating directly on a 3% methanol in water solution at a temperature of 60°–80° C., have been shown to deliver an output of 0.50 V at 300 mA/cm$^2$. This output level is quite high relative to that of prior direct oxidation methanol fuel cells.

The Support Layer

The porous support layer of the membrane may be made from a wide range of components. It is preferably made of a fluorine-containing polymer, and the interior is preferably hydrophilic.

The fluorine-containing polymer for the porous support layer, includes preferably polytetrafluoroethylene ("PTFE") or a copolymer of tetrafluoroethylene with

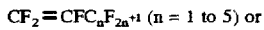

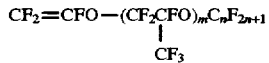

(m=0 to 15, n=1 to 15).

Microporous PTFE films and sheeting are known. U.S. Pat. No. 3,664,915 discloses uniaxially stretched film having at least 40% voids. U.S. Pat. No. 3,953,566, 3,962,153 and 4,187,390 disclose porous PTFE films having at least 70% voids. Pore size in the above films is at least typically 0.2 μm TEFLON® sheeting, including TEFLON® PFA and TEFLON® FEP, (commercially available from E. I. du Pont de Nemours and Company) may be useful, provided that they have sufficient molecular weight to form a film.

Perhalogenated polymers such as polychlorotrifluoroethylene may also be used, but perfluorinated supports have the best resistance to heat and chemicals.

A preferred fluorinated polymer is a polymer having an aliphatic ring structure containing fluorine, for example an amorphous polymer of perfluoro-2,2-dimethyl- 1,3-dioxole. In embodiments, the polymer is a homopolymer of perfluoro-2,2-dimethyl- 1,3-dioxole. In other embodiments, the polymer is a copolymer of perfluoro-2,2-dimethyl-1,3-dioxole, including copolymers having a complementary amount of at least one monomer selected from the group consisting to tetrafluoroethylene, perfluoromethyl vinyl ether, vinylidene fluoride and chlorotrifluoroethylene. In preferred embodiments, the polymer is a dipolymer of perfluoro-2,2-dimethyl- 1,3-dioxole and a complementary amount of tetrafluoroethylene, especially such a polymer containing 65–99 mole % of perfluoro-2,2-dimethyl- 1,3-dioxole. The amorphous polymer preferably has a glass transition temperature of at least 140° C., and more preferably at least 160° C. Glass transition temperature ($T_g$) is known in the art and is the temperature at which the polymer changes from a brittle, vitreous or glassy state to a rubbery or plastic state.

Examples of dipolymers are described in further detail in U.S. Pat. No. 4,754,009 and U.S. Pat. No. 4,935,477, both of E. N. Squire. The polymer may, for example, be an amorphous copolymer of perfluoro(2,2-dimethyl- 1,3-dioxole) with a complementary amount of at least one other comonomer, said copolymer being selected from dipolymers with perfluoro(butenyl vinyl ether) and terpolymers with perfluoro(butenyl vinyl ether) and with a third comonomer, wherein the third comonomer can be (a) a perhaloolefin in which halogen is fluorine or chlorine, or (b) a perfluoro(alkyl vinyl ether); the amount of the third comonomer, when present, preferably being at most 40 mole % of the total composition. Polymerization is performed by methods known in the art.

Other suitable polymers having an aliphatic ring structure containing fluorine are described in U.S. Pat. No. 4,897,457 of Nakamura et al. and Japanese Published Patent Application Kokai 4-198918 of Nakayama et al.; e. g., a fluorine-containing thermoplastic resinous polymer comprising a group of repeating units to be represented by the following general formula:

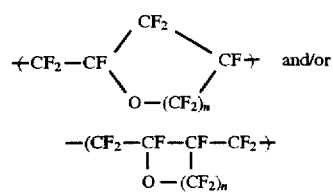

(where: n is an integer of 1 or 2); and copolymers thereof.

The glass transition temperature of the amorphous polymer will vary with the actual polymer of the membrane, especially the amount of tetrafluoroethylene or other comonomer that may be present. Examples of $T_g$ are shown in FIG. 1 of the aforementioned U.S. Pat. No. 4,754,009 of E. N. Squire as ranging from about 260° C. for dipolymers with tetrafluoroethylene having low amounts of tetrafluoroethylene comonomer down to less than 100° C. for the dipolymers containing at least 60 mole % of tetrafluoroethylene.

In preferred embodiments of the membrane of the present invention, the polymer is a copolymer of perfluoro-2,2-dimethyl-1,3-dioxole, especially a copolymer having a complementary amount of at least one monomer selected from tetrafluoroethylene, perfluoromethyl vinyl ether, vinylidene fluoride and chlorotrifluoroethylene.

In other embodiments, the polymer is a homopolymer of perfluoro-2,2-dimethyl- 1,3-dioxole.

In further embodiment, the polymer is a dipolymer of perfluoro-2,2-dimethyl- 1,3-dioxole and a complementary amount of tetrafluoroethylene.

A preferred support layer is TEFLON® AF (commercially available from E. I. du Pont de Nemours and Company) which is a dipolymer of perfluoro-2,2-dimethyl-1,3-dioxole and tetrafluoroethylene.

The porous support layer of the present invention may also be made from a hydrocarbon, preferably a polyolefin, preferably having a melting point below about 220° C. The polyolefins particularly useful in making membranes for fuel cells include polyethylene, polypropylene, polybutylene, copolymers of those materials, and the like. The porous support layer may be CELGARD® (commercially available from Hoechst Celanese Corporation), MILLIPORE® (commercially available from Millipore Corporation) or TYVEK® (commercially available from E. I. du Pont de Nemours and Company). Polyethylene is preferred and may be high, medium or low density.

The porous support layer (a) provides mechanical anchoring sites whereby the ion exchange membrane may be firmly bonded; (b) provides a support preventing the relatively thin ion exchange membrane from being ruptured or damaged; and (c) by virtue of the thinness and high porosity of the support layer does not greatly reduce the effective cross-section of the membrane for ionic conduction. In this way, porous supports can be used to inexpensively reinforce or armor thin fluorinated membranes to reduce fuel crossover, without greatly increasing the low resistance to ionic flow inherent in the unreinforced ion exchange membranes.

The porous support layer preferably has a pore size of about 0.05 to 10 μm and a porosity of from 50 to 95%, and the thickness is preferably from 30 to 200 μm to obtain low fuel crossover, low membrane resistance and high mechanical strength. Particularly preferred are a pore size of about 0.1 to 8 μm, a porosity of from 70 to 90% and a thickness of 60 to 100 μm. Porosity means a ratio of the volume occupied by pores to the entire volume of the porous material, and it is usually measured by a density method.

The porous support layer may be a non-continuous or a continuous sheet or may be a fabric, woven using various weaves, such as the plain weave, basket weave, leno weave, or others. Non-continuous layers or relatively open weaves are preferred because the electric resistance is lower.

The porous support layer may be on either one or both surfaces of the membrane. It may also be fully or partially embedded in the membrane. Preferably, the porous support layer is on the surface of the membrane. During operation the porous support layer preferably faces away from the liquid; i.e., toward the cathode compartment of a fuel cell. For example, in a direct methanol fuel cell, preferably the porous support layer faces the cathode compartment of fuel cell which faces away from the methanol during operation. The fibers used in the porous support layers comprising fabrics may be monofilaments or multifilament yarns. They may be of ordinary round cross-sections, or may have specialized cross-sections. Oblong or rectangular cross-sections, if suitably oriented to the membrane, make it possible to get more reinforcing action with a thinner overall membrane. It may be desirable to use sacrificial fibers such as rayon, paper, or polyester, along with the polymer fibers.

The above-mentioned porous support, especially a support of a fluorine-containing polymer, may be prepared by various methods, for instance, by a method wherein a fluorine-containing polymer is mixed with a pore-forming agent, and then formed into a film, followed by the extraction and removal of the pore-forming agent to obtain a porous material. However, the most preferred porous material in the present invention is a porous membrane obtained by forming a mixture of a fluorine-containing polymer, preferably non-sintered polytetrafluoroethylene, with a liquid lubricant such as white kerosene oil, kerosene or fluorine oil, into a membrane by extrusion or rolling, followed by monoaxial or multiaxial stretching treatment. Such a porous material may be subjected to sintering treatment at a temperature lower or higher than the melting point of the tetrafluoroethylene in a fixed state not to permit heat shrinkage.

In addition, a porous polytetrafluoroethylene ("PTFE") sheet may be prepared by a process comprising the steps of (a) contacting PTFE with a fluid which penetrates and swells, but does not significantly dissolve the polymer or eliminate viscoelastic memory therefrom, at a temperature in the range of about 250°–400° C.; (b) cooling and separating the penetrated, swollen polymer from unabsorbed fluid, said polymer containing up to about 50% by weight of absorbed fluid; and (c) removing the absorbed fluid, to form a porous product. In step (a), temperatures within the range of about 250° C. to 400° C., should be sufficiently high for the selected fluid to extensively penetrate and swell the PTFE under process conditions, but low enough to avoid significant dissolution of the polymer or loss of lo viscoelastic memory therefrom. Preferably, the temperature is at or near the melting point of the PTFE under process conditions. Usually, this temperature is in the range of about 290° C. to 360° C. - toward the lower end for sintered or uncrystallized PTFE, and toward the higher end for virgin or unsintered PTFE. Some of these porous PTFE products may have a fibrillar structure.

In addition, a porous, shrink-resistant PTFE shaped article may be prepared by subjecting the porous product from step (b) or step (c) above to low-rate uniaxial or biaxial stretching, or wherein step (c) and stretching are performed simultaneously. The porous, shrink-resistant PTFE shaped article has a mean pore size of less than about 10 μm, and a porosity of at least 40%.

Conventional multilayered membranes composed of a porous support layer and an ion exchange resin layer have extremely large pore sizes and thickness, and the electric resistance is necessarily high. In order to obtain a low resistance membrane while maintaining good mechanical strength and low fuel crossover, it is desirable to reduce the thickness of the porous layer, and in order to retain high mechanical strength in such a case, it is desirable to reduce the pore size to a level of about 0.05 to 10 μm. To obtain such properties, it is preferred to use a stretched porous support material.

An improvement may also be obtained by using a porous layer with its interior surface being hydrophilic. Accordingly, the porous layer of the present invention has a hydrophilic nature in its interior surface by having at least a portion of its interior pore surfaces coated with a fluorine-containing monomer or polymer having a hydrophilic nature preferably a perfluoro ion exchange polymer. The membrane may also initially contain water soluble surfactant within its pores to enhance initial wetting.

The porous layer of the fluorine-containing polymer may be treated to impart a hydrophilic nature to the interior thereof, prior to or subsequent to the lamination with an ion exchange resin layer. Various methods may be employed as a means to impart the hydrophilic nature to the porous material. For instance, an inorganic hydrophilic nature-imparting agent is incorporated during the formation of the porous material to impart the hydrophilic nature to the material forming the porous layer. Examples of such an inorganic hydrophilic nature-imparting agents are oxides, hydroxides, nitrides and carbides of e.g. titanium, zirconium, niobium, tantalum, vanadium, manganese, molybdenum and tin, as well as silicon carbide, barium titanate and barium sulfate.

As another means to impart a hydrophilic nature to the interior of the fluorine-containing polymer, a hydrophilic monomer is impregnated into the porous material in an amount not to reduce the porosity excessively, followed by polymerization; a method wherein a hydrophilic polymer is impregnated or coated in a form of a solution, followed by drying and optionally sintering; or a method wherein the fluorine-containing polymer itself is a polymer of a monomer having hydrophilic groups.

Monomers and polymers having a hydrophilic nature include a fluorine-containing monomer or polymer having carboxylic acid groups, sulfonic acid groups and/or phosphoric acid groups, which may form an ion exchange resin layer as described hereinafter. Thus, such a monomer having a hydrophilic nature is impregnated into a porous material and polymerized, or a polymer of such a monomer is coated on a porous material in the form of a solution having a concentration of from 0.5 to 50% by weight, preferably 1 to 10% by weight, most preferably 2 to 6% by weight. Such a fluorine-containing polymer having a hydrophilic nature is deposited on the porous material preferably in an amount of from 1 to 300% by weight, preferably from 1 to 100% by weight, most preferably 1 to 10% by weight relative to the porous material.

The hydrophilic nature can also be imparted efficiently by forming an inorganic hydrophilic particle layer on the surface of the porous layer. The particle layer may have an electrocatalytic activity, or may not have such an electrocatalytic activity. The particle layer may be a porous layer having a thickness of from 0. to 50 μm, preferably from 0.5 to 20 μm, or may be a sporadic particle layer. The above-mentioned particle layer may be formed on a porous layer surface by substituting the above-mentioned fluorine-containing porous layer for the ion exchange membrane.

The hydrophilicity of the membrane is important to the properties of the membrane during operation of the fuel cells. The hydrogen ions diffusing through the membrane carry on average about 4 water molecules per hydrogen ion as a hydrate shell during their migration. As a result, the membrane loses water on the anode side and dries out in the course of time, while an excess of water is present on the cathode side. Imparting a hydrophilic nature to the interior of the porous support facilitates diffusion of the hydrogen ions through the membrane, thereby reducing electric resistance and improving performance. In addition, it is believed that the hydrophilic nature of the porous layer assists in preventing the membrane from dehydrating due to heat produced by the electrochemical reduction.

After imparting the hydrophilic nature to the porous layer, the multi-layered membrane may be used in the fuel cell.

Thus, the reinforced membrane according to the present invention, provides low membrane resistance for the generation of electricity in a fuel cell, and by the use of a porous reinforcing layer, preferably a stretched porous layer. It also provides low fuel crossover and high mechanical strength, especially high tear strength required for the membrane during use in the fuel cell or in its handling.

Ion Exchange Layer

The ion exchange resin polymer, preferably in the form of a layer, may be made from any number of ion exchange resins which are well known in the art, such as from a fluorine-containing polymer which is well know in the art. Such polymers preferably have an ion exchange capacity of from 0.5 to 2.0 meq/g dry resin, and preferably have carboxylic acid groups, sulfonyl groups or phosphoric acid groups or functional groups which may be hydrolized to salts, e. g., sulfonyl groups which may be hydrolyzed to sulfonic acid groups.

The ion exchange resin layer used in this invention is fluorinated, which means that at least 90%, preferably at least 95%, and most preferably all of the atoms attached to the carbons are F atoms or side-chain ether groups, which may contain acid groups or functional groups hydrolyzable to salts. The non-fluorine atoms, if used, may be H, Cl or Br. The following examples of fluorinated sulfonyl and carboxylic acid polymers are not limiting:

The sulfonyl polymers according to this invention are fluorinated polymers with side chains containing the group —$CF_2CFR'SO_2X$, wherein R' is F, Cl, $CF_2Cl$ or a $C_1$ to $C_{10}$ perfluoroalkyl radical, and X is F or Cl, preferably F. Ordinarily, the side chains will contain —$OCF_2CF_2CF_2SO_2X$ or —$OCF_2CF_2SO_2F$ groups, preferably the latter. The perfluorinated polymers are preferred.

Polymers containing the side chain

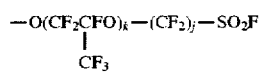

where k of 0 or 1 and j is 3, 4, or 5, may be used.

Preferred polymers contain the side chain —$(OCF2CFY)_r$—$OCF2CFR'SO_2X$, where R', Y, and X are as defined above;

and r is 0, 1, 2, or 3. Especially preferred are copolymers containing the side chain

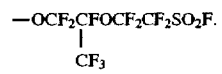

Such sulfonyl polymers may be hydrolyzed to their acid form.

The salt-form carboxylic polymers have a fluorinated hydrocarbon backbone chain to which are attached side chains carrying, before hydrolysis to the acid form, certain functional groups hydrolyzable in an alkaline medium to carboxylate groups, such as nitrile or ester groups. The polymers include, e.g., those containing the —$(OCF2CFY)_n$—O—$CF_2$—$CF_2$—W side chains, where Y is F or $CF_3$; n is 0, 1, or 2; and W is COOR or —CN, where R is lower alkyl. Among these polymers, those with n=1 and Y=$CF_3$ are preferred.

Polymerization to form the sulfonyl or carboxylic acid pre-cursor polymers may be carried out by known methods.

The copolymers used in the manufacture of ion exchange resin layers used in the membrane of the present invention should be of high enough molecular weight to produce films which are self-supporting in their melt-fabricable (precursor) form and preferably in the hydrolyzed ion exchange form.

The equivalent weight of the ion exchange resin is about 500 to about 2000. The precise equivalent weight is not critical, and depends somewhat on the structure of the salt-containing side chain on each polymer. It may be obtained by using a mole ratio of tetrafluoroethylene to the comonomer in the carboxylate copolymer of 5.0–8.2, preferably 6.0–7.4. In the case where the carboxylate side chains are salts of —$OCF_2$—$CF(CF_3)$—O—$CF_2$—$CF_2$—COOH, the broad equivalent weight of the non-porous layer in contact with the catholyte should be 900–1230, and the preferred equivalent weight will be 1000–1150. The equivalent weights are expressed for the —$COOCH_3$ form.

The equivalent weight of the sulfonate polymer is even less critical. In the case where the side chain is the salt of —O—$CF_2$—$CF(CF_3)$—O—$CF_2$—$CF_2$—$SO_3H$, the equivalent weight should be 500–2000, preferably 700–1500, and most preferably about 970. The equivalent weight of the sulfonate layer is calculated for the —$SO_2F$ form.

The ion exchange resin layer may also be made of a laminated layer or a blended layer comprising two or more polymers, especially fluorine-containing polymers having different ion exchange groups and/or different ion exchange capacities. Namely, by using a combination of at least two types such as a combination of a fluorine-containing polymer having carboxylic acid groups and a fluorine-containing polymer having sulfonic acid groups, or a combination of at least two fluorine-containing polymers of the same type with different ion exchange groups, the respective fluorine-containing polymers may be blended to form an ion exchange resin layer, or the respective fluorine-containing polymers may preliminarily be formed into films, and such films are preferably heated and pressed for lamination to form an ion exchange resin layer. Further, the ion exchange resin layer may also be formed by converting ion exchange groups such as sulfonic acid groups on one side or both sides of a fluorine-containing polymer film into carboxylic acid groups.

The thickness of the ion exchange resin layer is not critical to the present invention, but is generally important in the operation of the fuel cell.

Namely, an ion exchange membrane has low water-permeability, and thus has a higher resistance as compared with a porous support layer. In a multilayer ion exchange membrane, for example, the thickness of the ion exchange resin layer on the cathode side of the fuel cell is made preferably as small as possible, and usually smaller than the porous layer on the anode side. The thickness of the ion exchange resin layer or layers should be less than about 250 µm, preferably less than 100 µm and most preferably about 25 µm.

The ion exchange resin layer(s) are preferably integrally adhered or laminated to the porous support layer. There is no particular restriction as to the manner for such lamination or support. However, it is preferred that an ion exchange membrane is overlaid on the anode side surface of the porous layer, and heated and fused at a temperature of at least the softening temperature of the ion exchange membrane, preferably at least the melting point of the ion exchange membrane, e.g. from about 100° C. to 250° C.

In addition to such a method, it is possible to spray a suspension, dispersion or solution of the ion exchange resin onto the porous support layer or to form a coating layer in which a solution, suspension or paste of the polymer for forming the ion exchange resin layer (optionally with other resins or plasticizers), is coated on one or both sides of the porous support layer, and the solvent is evaporated or the coating is heated to a temperature higher than the softening point of the polymer. In any case, in the present invention, any method may be employed so long as it provides a coating or layer in which an ion exchange resin is integrally coated, laminated or supported on one or both sides of the porous support layer. The total thickness of the membrane will be from about 20 to 550 µm, preferably from 70 to 350 µm, most preferably from 75 to 175 mµ.

It is also possible to provide a gas and liquid permeable porous layer containing electrocatalytically inactive particles or a gas and liquid permeable porous layer on one or both surfaces of the ion exchange resin layer of the present invention, to further reduce the membrane resistance during operation of the fuel cell.

Industrial Utility

The generation of electricity in the fuel cell or batteries, by means of the multi-layered membrane of the present invention may be conducted under known conditions. Fuel cells and batteries have application as a power source for aerospace devices, unmanned facilities on sea or shore, stationary or movable radios, automobiles or domestic appliances. A plurality of electrochemical fuel cells are often used to provide an economical multistage operation.

EXAMPLES

Samples of various porous supports were laminated to NAFION® XR film having an equivalent weight of 1100 (commercially available from E. I. du Pont de Nemours and Company). The composition and thickness of the porous support is described in Table 1. The thickness of the NAFION® XR film is reported in Table 1. The composite structures were evaluated for methanol crossover.

The composite structures were prepared as follows: The composite structures of Examples 1–4 were prepared by attaching a 1 mil NAFION® XR film with a 1 mil MPTFE film, at a temperature of about 225° C. and at a vacuum of −30 to −70 kPa. The MPTFE was laminated with its length in the machine direction. It was positioned unrestrained directly on release paper under the NAFION® film and vacuum was applied. Example 5 was prepared by spraying a hydrolyzed sample of 7 mil NAFION® XR film with a 1.5 weight percent solution of TEFLON(® AF 1601 in FLOU-RINERT® FC-75 solvent (commercially available from 3M Corporation) and then drying at room temperature. The thickness of the TEFLON® AF 1601 coating was about 0.5 mil. The structure of Example 6 was prepared by hydrolyzing the NAFION®/MPTFE composite of Examples 1–4 and then spraying it with a 1.5 weight percent solution of TEFLON® AF 1601 in FLOURINERT(® FC-75 and then drying at room temperature. The thickness of the TEFLON® AF 1601 coating was about 0.5 mil.

For comparison, samples of 2 mil NAFION® film (Comparative Example 1) and 1 mil MPTFE film (Comparative Example 2) were also evaluated for methanol crossover.

A circular sample approximately 11.4 cm in diameter was hydrolyzed and placed in a permeability cell. The permeability cell was filled with an aqueous solution of 3.2% by weight methanol at 60° C. for 3 hours. The component layers of the respective membranes and the methanol crossover as determined by gas chromatography (using J&B "Megabore" column with DB wax packing and a thermal conductivity detector) are reported in Table 1. Methanol permeation was calculated as the (slope of permeant volume vs. time) times (mean methanol concentration in permeant)/(permeant density) and is reported as $10^5 \times ml/min \times cm^2$ in Table 1 below:

TABLE 1

| | Composition of Membrane | | | | Methanol Crossover $10^5 \times ml$ Methanol/ min cm$^2$ |
|---|---|---|---|---|---|
| | Thickness of NAFION® XR Film (mils) | Porous Substrate Layer | Thickness of Porous Substrate Layer (mils) | Total Thickness of Composite Membrane (mils) | |
| Comp. Examples | | | | | |
| 1 | 2 | None | 0 | 2 | 4.33 |
| 2 | 0 | MPTFE | 1 | 1 | 6.26 |

TABLE 1-continued

| | Composition of Membrane | | | | Methanol |
|---|---|---|---|---|---|
| | Thickness of NAFION ® XR Film (mils) | Porous Substrate Layer | Thickness of Porous Substrate Layer (mils) | Total Thickness of Composite Membrane (mils) | Crossover $10^5 \times$ ml Methanol/ min cm$^2$ |
| Examples | | | | | |
| 1 | 1 | MPTFE, (facing away from liquid) | 1 | 2 | 3.92 |
| 2 | 1 | MPTFE, (facing toward liquid) | 1 | 2 | 4.32 |
| 3 | 1 | MPTFE, (facing away from liquid) | 1 | 2 | 3.83 |
| 4 | 1 | MPTFE, (facing toward liquid) | 1 | 2 | 4.20 |
| 5 | 7 | TEFLON ® AF 1601 (facing away from liquid) | 7 | 7.5 | 1.47 |
| 6 | 1 | MPTFE and TEFLON ® AF 1601 (facing away from liquid) | 1.5 | 2.5 | 2.21 |

Glossary:
NAFION ® is an ion exchange film commercially available from E. I. du Pont de Nemours and Company having an equivalent weight of approximately 1070 and a melt flow of 7.2.
TEFLON ® AF 1601 is a polymer film commercially available from E. I. du Pont de Nemours and Company.
MPTFE was fabricated from granular polytetrafluoroethylene which was pressed in a cylindrical mold containing a central mandril at 5000 psi and room temperature to create a preformed cylinder with a hole in the axial dimension. This cylinder was then placed in a pressure vessel along with about 0.8 mL of fluorobenzene per gram of polymer. The vessel was then heated to 350° C. under autogenous pressure for about one hour. After cooling to room temperature, the cylinder was removed from the pressure vessel and skived into a film. This film was stretched biaxially approximately 3× in each direction to give a film with a final thickness of 0.001 inch (25.4 micrometers). The film had a void content of about 65% and a heat of fusion of about 45 J/g.

It is apparent from the comparison of Comparative Examples 1 and 2 to Examples 1–6, that the membrane with the porous support layer reduces fuel crossover, especially when the porous support is facing away from the methanol solution. The reinforced membrane exhibits lower methanol crossover than both the unreinforced ion exchange film and the independent porous substrate. The advantageous reduction in fuel crossover for the reinforced fuel cell membrane cannot be attributed in its entirety to the thickness of the membrane. In addition, it is believed that the reinforced membranes of Examples 1–6 have improved mechanical strength. As noted above, the reinforced membrane comprising one ion exchange layer and one porous support layer provides lower fuel crossover when the porous support layer faces away from the fluid; i.e., in a fuel cell the porous support layer faces the cathode compartment.

What is claimed is:

1. A fuel cell comprising anode and cathode compartments partitioned by a reinforced polymeric ion exchange membrane, said membrane consisting essentially of
   (a) at least one ion exchange polymer selected from the group consisting of perfluorinated polymers with side chains containing the group —CF$_2$CF$_2$SO$_2$F, and
   (b) a porous support layer comprising a microporous film of perfluorinated polymer selected from the group consisting of polytetrafluoroethylene and copolymers of tetrafluoroethylene with

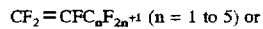

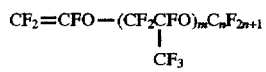

m=0 to 15, n=1 to 15, said support layer being fully embedded in said membrane.

2. The fuel cell of claim 1 wherein said porous support layer has a pore diameter from about 0.05 to 10 μm, a porosity of about 50–95% and a thickness of about 10 to 200 μm.

3. The fuel cell of claim 1 wherein the porous support layer has interior surfaces which are substantially hydrophilic.

4. The fuel cell of claim 1 wherein the total thickness of the membrane is about 20 to 550 μm.

5. The fuel cell of claim 1 wherein the transport of methanol in a 4% by weight aqueous solution across the membrane at 60° C. is less than $4\times10^{-5}$ ml methanol/minute ·cm$^2$.

6. The fuel cell of claim 1 wherein the fuel cell operates with a liquid hydrocarbon fuel.

7. The fuel cell of claim 6 wherein the fuel cell operates with a fuel of methanol.

8. The fuel cell of claim 1 wherein fuel transport is reduced by at least 10% compared to the fuel transport in a fuel cell having said membrane with no porous support layer.

9. A fuel cell comprising anode and cathode compartments partitioned by a reinforced polymeric ion exchange membrane, said membrane comprising
   (a) at least one ion exchange polymer, and
   (b) a porous support layer comprising a polymer having an aliphatic ring structure containing fluorine.

10. A fuel cell comprising anode and cathode compartments partitioned by a reinforced polymeric ion exchange membrane, said membrane consisting essentially of
   (a) at least one ion exchange polymer selected from the group consisting of perfluorinated polymers with side chains containing the group —CF$_2$CF$_2$SO$_2$F, and
   (b) a porous support layer comprising a microporous film of perfluorinated polymer selected from the group consisting of polytetrafluoroethylene and copolymers of tetrafluoroethylene with

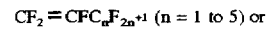

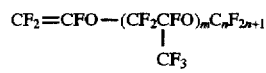

m=0 to 15, n=1 to 15, said porous support layer being on one surface of the membrane and said surface facing the cathode compartment of the fuel cell.

* * * * *